Figure 1:
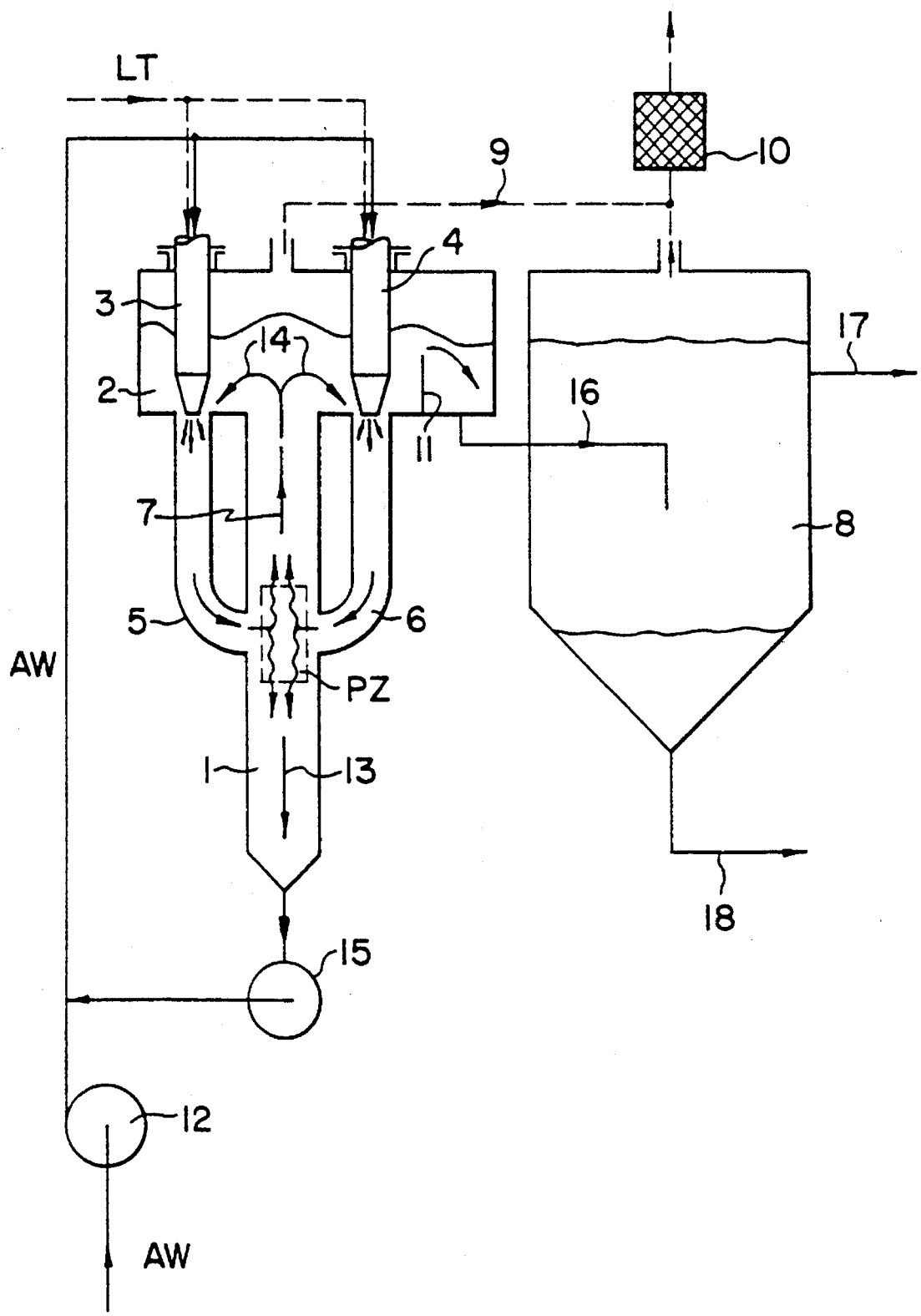

United States Patent [19]
Gaddis

[11] Patent Number: 5,489,380
[45] Date of Patent: Feb. 6, 1996

[54] APPARATUS FOR THE BIOLOGICAL PURIFICATION OF SEWAGE

[75] Inventor: Edward S. Gaddis, Clausthal-Zellerfeld, Germany

[73] Assignee: Otto Oeko-Tech GmbH & Co., KG, Cologne, Germany

[21] Appl. No.: 197,413

[22] Filed: Feb. 14, 1994

Related U.S. Application Data

[62] Division of Ser. No. 163,198, Dec. 6, 1993, Pat. No. 5,364,530, which is a continuation of Ser. No. 830,982, Feb. 4, 1992, abandoned, which is a continuation of Ser. No. 437,798, Nov. 17, 1989, abandoned.

[30] Foreign Application Priority Data

Nov. 17, 1988 [DE] Germany .................. 38 38 846.4

[51] Int. Cl.$^6$ ................................. C02F 3/20
[52] U.S. Cl. ................ 210/199; 210/202; 210/205; 210/218
[58] Field of Search ................ 210/626–629, 210/150, 151, 199, 202, 205, 218, 220

[56] References Cited

U.S. PATENT DOCUMENTS

| 3,897,000 | 7/1975 | Mandt ...................... 210/629 |
| 4,009,100 | 2/1977 | Hess et al. ................ 210/627 |

*Primary Examiner*—Thomas Wyse
*Attorney, Agent, or Firm*—Anderson Kill Olick & Oshinsky

[57] ABSTRACT

A process for the biological purification of sewage is specified, with which sewage (AW), containing dissolved pollutants, and air (LT) are fed together to a reactor (1) via at least two mutually separate nozzles (3,4). To achieve a high substance exchange in the reactor (1), the streams of the two-substance mixture emanating from the nozzles (3,4) are conducted such that they make impact with each other in the said reactor in an impact zone (PZ). The sewage (AW) is passed from the reactor (1) into Pa settling tank (8), in which bio sludge settles.

8 Claims, 4 Drawing Sheets

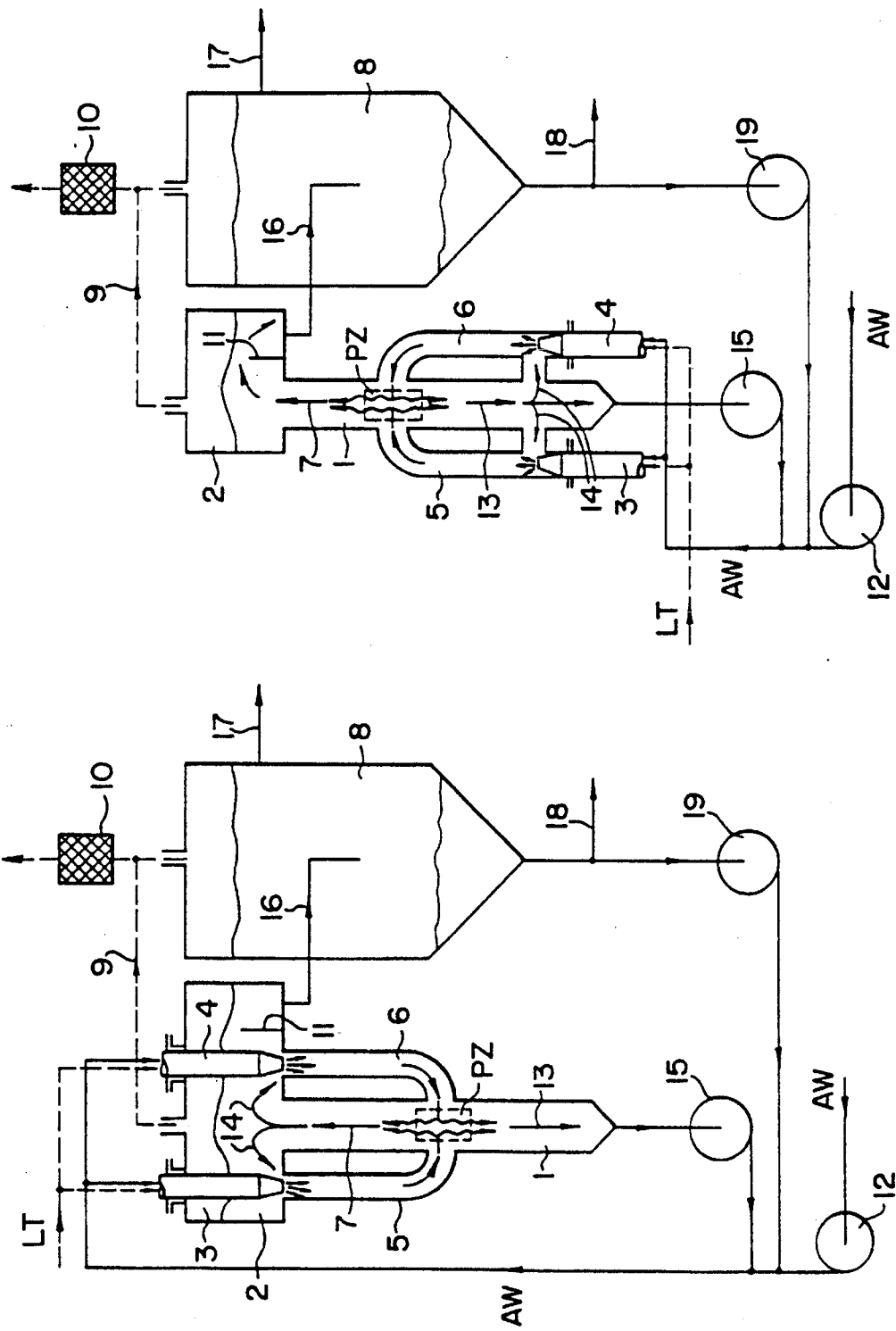

APPARATUS FOR THE BIOLOGICAL PURIFICATION OF SEWAGE

This is a divisional application of Ser. No. 08/163,198, filed Dec. 6, 1993, now U.S. Pat. No. 5,364,530; which in turn is a continuation application of Ser. No. 07/830,982, filed Feb. 4, 1992, abandoned, and which in turn is a continuation application of Ser. No. 07/437,798, filed Nov. 17, 1989, abandoned.

DESCRIPTION

The invention relates to a process for the biological purification of sewage, with which sewage, containing dissolved pollutants, and air are introduced together under pressure, via at least one nozzle into a reactor designed as a tank and are passed on in the reactor as a two-substance mixture, as well as to an apparatus for carrying out the process.

In the biological purification of sewage, pollutants dissolved in the same are degraded by bacteria or microorganisms. In order to increase their effectiveness or to accelerate their multiplication, oxygen is fed to the sewage. This can take place by supplying air or else pure oxygen. Often, nutrients are also fed to the sewage. In the case of known sewage treatment plants, this takes place in so-called activated sludge tanks. The sludge biologically produced thereby is separated from the purified waste water in a downstream sedimentation tank. The tanks used for this process have a large space requirement. In spite of this, the biological degradation rate is not satisfactory and the open design often leads to a very disturbing odour nuisance for the surroundings.

Therefore, processes have been developed in which, instead of the activated sludge tank, high-performance reactors with significantly reduced space requirement and increased biological degradation rate are used. Such a process, described at the beginning; emerges from the German journal "Chem. Ind. XXXVII/January 1985", pages 43 to 46. In this process, a compact reactor is used which consists of a cylindrical tank, in which a cylindrical insert tube, open at both ends, is arranged. A mixture consisting of sewage and air is introduced into the insert tube via a two-substance nozzle. The air fed via the two-substance nozzle is dispersed into tiny bubbles on account of great shearing forces in the region of the two-substance nozzle, so that a large exchange surface is produced and the charge of oxygen is favourably influenced. With this known process, the biological degradation rate can be increased considerably in comparison with conventional processes with activated sludge tanks. However, since the high substance exchange takes place essentially in the region of the two-substance nozzle and the turbulence in the insert tube is damped relatively quickly by the sewage, this process also is unsatisfactory in many cases.

The invention is based on the object of specifying a process for the purification of sewage, with which the substance exchange upon introduction of oxygen into the sewage is significantly increased.

According to the invention, this object is achieved by a process of the type described at the beginning by the sewage and the air being fed to the reactor via at least two mutually separate nozzles, the streams of the two-substance mixture emanating from the nozzles being conducted in the reactor such that they make impact with each other in the said reactor in an impact zone and by the sewage being passed after de composition from the reactor into a settling tank.

Due to the shearing field of the sewage in the direct region behind the openings of the nozzles, on leaving the nozzles, the air is divided into very small bubbles. At the same time, the sewage jets emanating from the nozzles suck in sewage or an air/sewage mixture from the inside of the reactor. As a result, homogeneous two-substance streams form downstream of the nozzles. The two-substance streams are deflected, for example by elbows, such that they collide within the reactor in the impact zone, in which the air bubbles are divided further. The kinetic energy of the flowing air/sewage mixture is thereby dissipated. As a result, a high turbulence and a large substance exchange surface in the impact zone and in the other parts of the reactor above and below the impact zone are produced. With the same energy charge as in the case of the known process, the substance exchange thus achieved is significantly higher. Thus, with this process, in a simple way significantly more oxygen is introduced into the sewage than was previously possible. The process therefore makes possible a considerably increased biological degradation rate.

Advantageous developments of the invention, which also concern in particular an apparatus for carrying out the process, emerge from the subclaims.

Figure 5:
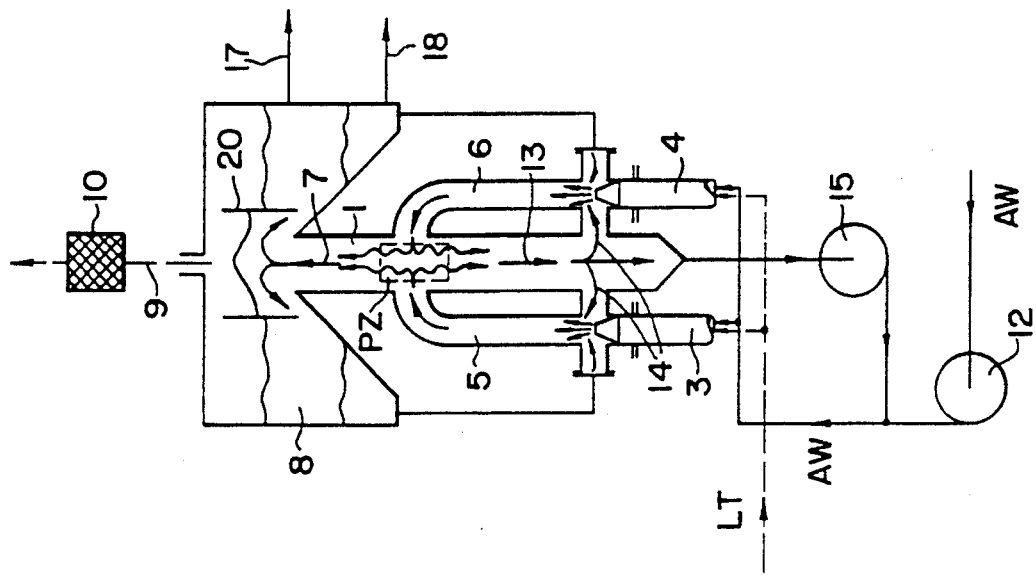
Figure 4:
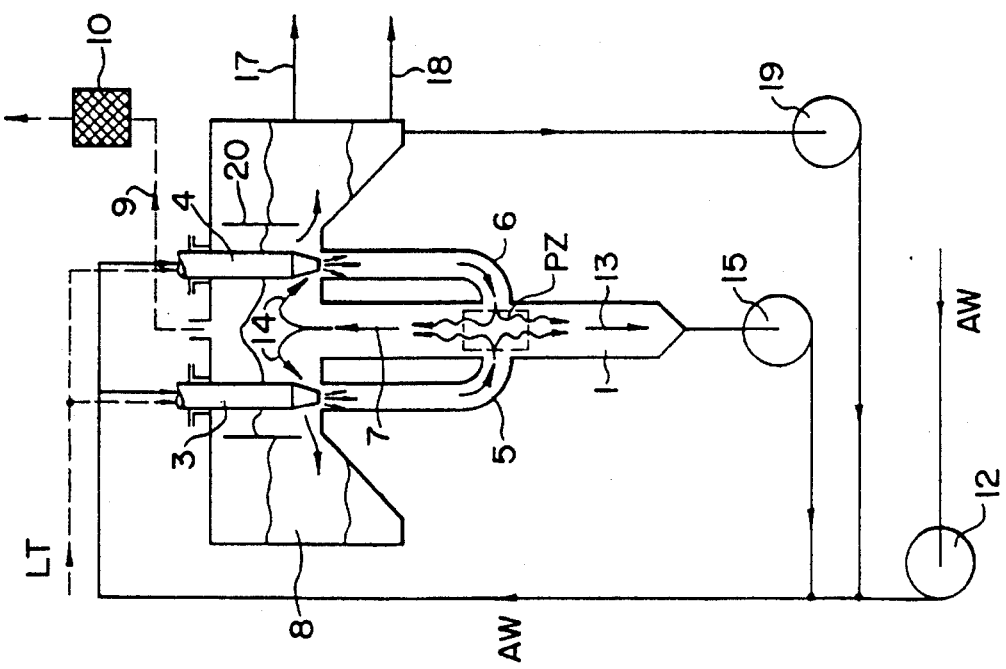

Process and apparatus according to the invention are explained in exemplary embodiments with reference to the drawings in which:

FIG. 1 shows in diagrammatic representation an apparatus for carrying out the process according to the invention, FIGS. 2 and 3 show two apparatuses added to in comparison with FIG. 1 and with different arrangement of the nozzles, FIGS. 4 and 5 show two apparatuses modified in comparison with FIGS. 2 and 3, FIGS. 6 and 7 show two further developments of the apparatus.

In a reactor 1, which is preferably designed as an elongated cylinder, air LT and sewage AW, containing dissolved pollutants, are to be mixed with each other. In this process, as large a quantity as possible of oxygen contained in the air LT is to be introduced into the sewage AW. The reactor 1 opens out with its upper end, in working position, into a compartment 2. Two nozzles 3 and 4, to which the sewage AW on the one hand and the air LT on the other hand are fed, are arranged in the compartment 2. The nozzles 3 and 4 are in this case arranged such that the jets emanating from them pass into conduit tubes 5 and 6, which for their part open out into the reactor 1 at two diametrically opposite points.

The conduit tubes 5 and 6 may—as is evident from the drawings—run substantially parallel to the reactor 1 and, after passing around an elbow, of preferably 90°, are connected to the reactor 1. The two-substance mixtures of sewage AW and air LT, conducted separately in the conduit tubes 5 and 6, meet each other in the reactor 1 in an impact zone PZ outlined by broken lines. The sewage can rise upwards according to the arrow 7, from where it passes after decomposition via the compartment 2 into a settling tank 8. The excess air (remaining oxygen and atmospheric nitrogen) can escape as exhaust gas according to the broken-line arrow 9 from the compartment 2 via a filter 10. Exhaust gas escaping from the settling tank 8 can also be passed via the filter 10. In the compartment 2 there is a weir 11 fitted, by which the decomposition necessary for the separate outflow or discharge of sewage and exhaust gas is achieved. The height of the weir 11 is variable.

Two nozzles 3 and 4 are in each case represented in the drawings. However, more than two nozzles, mutually separate in each case, may also be used. They are preferably made from two concentric tubes as two-substance nozzles. As far as geometry and dimensions are concerned, the nozzles 3 and 4 are preferably identically designed, so that the reactor 1 is fed two or more uniform streams of the two-substance mixture.

The arrangement of the conduit tubes 5 and 6 with a substantially parallel run to the reactor 1 is not obligatory. They could also run obliquely to the reactor 1. The conduit tubes 5 and 6 also do not have to open out into the reactor 1 such that the emanating streams meet each other frontally in the impact zone PZ. Rather, the streams could also make impact with each other at an angle other than 180°. In a preferred embodiment, however, the streams make impact with each other frontally, that is to say at an angle of 180°.

If more than two nozzles 3 and 4 are used, the mouths of the corresponding conduit tubes 5 and 6 are expediently arranged evenly offset on the circumference of the reactor 1, thus, in the case of three nozzles, there is for example an angle of 120° in each case between the mouths. This also applies if the nozzles 3 and 4 open out directly into the reactor 1 without conduit tubes 5 and 6.

The process and apparatus according to FIG. 1 operate for example as follows:

The reactor 1 is fed sewage AW and air LT separately via the nozzles 3 and 4. For this purpose, the sewage AW, laden with dissolved pollutants and microorganisms, is delivered by means of a pump 12. On account of the shearing field of the sewage AW at the outlet openings of the nozzles 3 and 4 the air LT is dispersed. The gas bubbles produced are entrained by the sewage AW and the two-substance mixture thus produced makes impact with each other in two streams in the impact zone PZ. As a result, the gas bubbles are further dispersed, so that an increased substance exchange takes place. Starting from the impact zone PZ, two two-substance flows lead in opposite directions within the reactor 1, according to the arrows 7 and 13. It is achieved as a result that a large part of the gas bubbles in the impact zone PZ remains in suspension and is constantly dispersed further. This leads to a further increase in the substance exchange. For this reason, in a preferred embodiment, the impact zone PZ is created in the reactor 1 as centrally as possible, that is to say approximately in the middle.

For further improvement of the substance exchange, the two-substance mixture within the reactor 1 may also be conducted in an internal circuit, which is intended to be indicated by the arrows 14. For this purpose, after decomposition, the sewage may also be removed from the reactor 1 in the direction of the arrow 13 and fed by means of a pump 15 back to the nozzles 3 and 4, to be precise together with the sewage AW delivered by the pump 12.

The sewage emanating from the reactor 1 upwards in the direction of the arrow 7 passes into the compartment 2. From there, after decomposition, it is passed through the weir 11 in the direction of the arrow 16 into the settling tank 6, in which the bio sludge containing microorganisms settles and separates from the purified waste water. The waste water can be released into the recipient in the direction of the arrow 17. The bio-sludge can be removed as excess sludge in the direction of the arrow 18 and fed to further processing.

In the case of the embodiments of the apparatus according to FIGS. 1 and 2, the nozzles 3 and 4 are arranged in the upper region of the reactor 1. According to FIG. 3, they may also be fitted in the lower region of the reactor 1. This does not change the operating principle of the apparatus.

The microorganisms required for the purification of the sewage are contained in the bio-sludge settling in the settling tank 8. It is therefore particularly expedient if a part of the bio-sludge is conducted back into the reactor 1 together with the sewage AW. A corresponding complete apparatus is evident from FIGS. 2 and 3:

The sewage AW to be purified, delivered by the pump 12, and bio-sludge delivered from the settling tank 8 by means of a pump 19 are mixed with the sewage to be returned into the reactor 1 (pump 15) and conducted into the reactor 1 with oxygen-containing air LT via the nozzles 3 and 4. The sewage streams emanating from the nozzles 3 and 4 with the bio-sludge and the evenly distributed gas bubbles are—as already described for FIG. 1—conducted through the conduit tubes 5 and 6 and deflected by the elbows of the latter. They finally collide within the reactor 1. In the impact zone PZ, again a high substance exchange takes place, on the one hand between the sewage AW and the air LT and on the other hand between the sewage AW and the microorganisms.

The apparatuses according to FIGS. 4 and 5 differ from those of FIGS. 2 and 3 in that the reactor 1 is integrated with the settling tank 8, which is set on the reactor 1 on the upper end, in working position of the said reactor instead of the compartment 2. The separation of the sewage in the reactor 1 from the sewage in the settling tank 8 is performed by a rotating, preferably cylindrical, partition wall 20. In FIG. 4, the gassing of the sewage from above is represented and in FIG. 5 from below. Since, in gassing from below, the nozzles 3 and 4 can suck in the sludge to be returned from the settling tank 8 into the reactor 1, the use of the pump 19 for the return of the bio-sludge can be dispensed with in the case of this apparatus.

Figure 6:
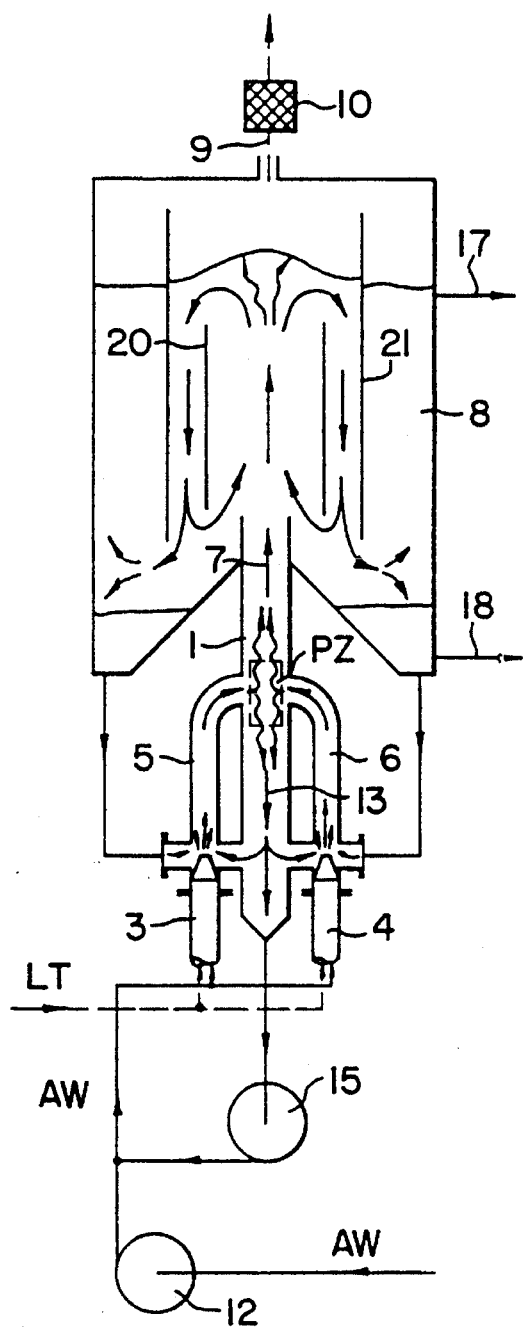

The reactor 1 is distinguished by a very high substance exchange rate. This means that only a small reactor volume and a small average residence time are required in order to achieve a certain oxygen concentration in the sewage. The space requirement for the degradation of the pollutants dissolved in the sewage to be achieved by the microorganisms is higher than that for the intensive gassing of the sewage AW in the reactor 1. The separation of the reactor space into two zones can therefore lead to a reduction in the energy requirement. FIG. 6 shows such an apparatus for the case where the gassing of the reactor 1 is performed from below.

The first zone corresponds to the reactor 1, into which a high volume-related output is introduced. In this zone, the oxygen concentration in the sewage AW is greatly increased (>>2 mg/l) and very small bacteria agglomerates with a large volume-related exchange surface are generated by the bio-sludge in the sewage. The second zone contains the volume of the sewage within the partition wall 20 and above the reactor 1. In this space, a cylindrical circulation tube 21 may preferably be fitted concentrically to the partition wall 20. Due to the pulsed stream of the two-phase flow emanating from the reactor 1 and the upward force of the rising gas bubbles, a sewage circulation takes place in this zone.

An oxygen exchange between the gas bubbles and the sewage likewise takes place in the second zone. However, compared with the first zone, this substance exchange occurs with reduced intensity. In the annular gap between the circulation tube 21 and the partition wall 20, the sewage flows downwards. At the lower end of the annular gap, a part of the downwardly directed sewage stream is deflected back into the circulation tube 21. The remaining part of the sewage stream passes into the settling tank 8. The bio-sludge is sucked in by the settling tank 8 by means of the nozzles 3 and 4, (or, if appropriate, by means of a pump) and partially returned into the reactor 1.

The second zone may also be provided with a fixed bed 22 in the form of a fill or an ordered pack. The fixed bed 22 has the effect of immobilising the microorganisms contained in the sewage and increasing their concentration in this zone. In order that the sewage circulation in the second zone is not excessively damped by the fixed bed 22, the said bed is preferably only arranged in the annular gap between partition wall 20 and circulation tube 21, as can be seen from FIG. 7.

By increasing the concentration of microorganisms in the second zone by means of the fixed bed 22, the requirement for bio-sludge to be returned from the settling tank 8 can be dispensed with completely.

Figure 7:
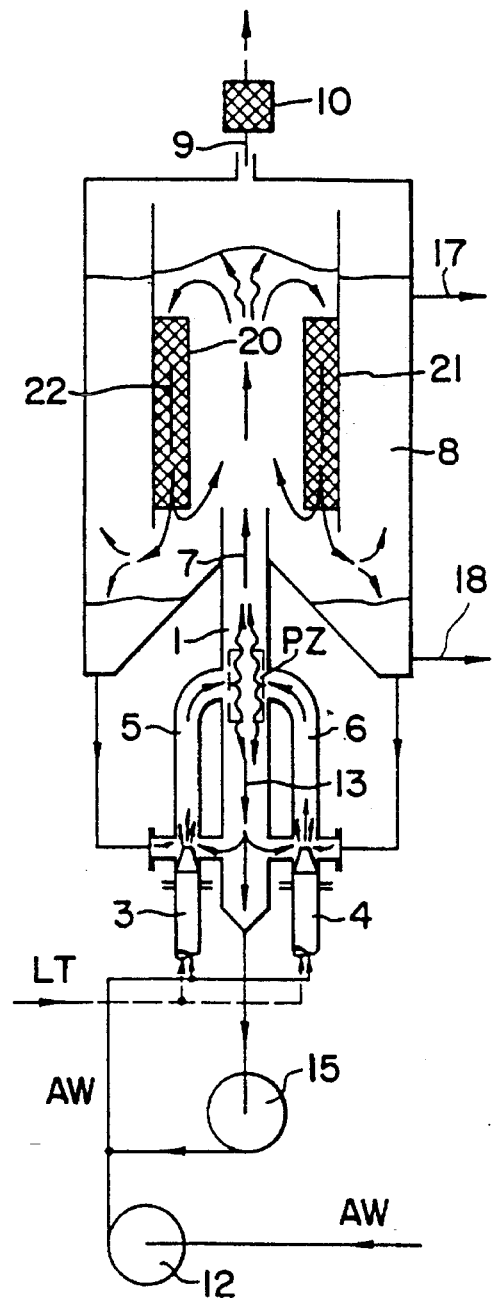

In the case of the apparatuses according to FIGS. 6 and 7, the nozzles 3 and 4 can be fitted to the reactor 1 at the bottom. However, they may also be arranged at the top, as emerges in principle from FIGS. 1, 2 and 4.

I claim:

1. An apparatus for biological purification of pollutant-containing sewage with introduction of air into the sewage for enhancing the purification process, said apparatus comprising:

a reactor for receiving a two-substance mixture of sewage with air, said reactor having a high turbulence zone;

at least two spaced conduit tubes for delivering the two-substance mixture of sewage with air into said reactor, said at least two conduit tubes having inlets and outlets thereof arranged at substantially same levels, with said outlets being located in said high turbulence zone and arranged in a facing relationship to each other, whereby streams of the two-substance mixture of sewage and air discharge from said outlets impacts on each other creating high turbulence;

at least two nozzles projecting into said inlets of said at least two conduit tubes for injecting the two-substance mixture of sewage and air into said at least two conduits tubes; and a settling tank connected with said reactor.

2. An apparatus according to claim 1, wherein said reactor has, at an end thereof remote from said high turbulence zone, a compartment, and at least one weir located in said compartment.

3. An apparatus according to claim 2, wherein a length of said reactor is so selected that separation of sewage and air takes place before sewage reaches said remote end of said reactor.

4. An apparatus according to claim 1, wherein said at least two nozzles are identical.

5. An apparatus according to claim 1, wherein said reactor and said settling tank form an integral unit.

6. An apparatus according to claim 1, wherein said settling tank has at least one partition wall for separating the two-substance mixture and pure water.

7. An apparatus according to claim 1, wherein said settling tank forms an extension of said reactor and is arranged in an upper portion of said reactor, said apparatus further comprising a circulation tube located in said settling tank for receiving the two-substance mixture rising from said reactor.

8. An apparatus according to claim 7, further comprising one of a fixed bed of a fill and an ordered pack arranged around said circulation tube.

* * * * *